United States Patent [19]
Iida

[11] Patent Number: 6,157,734
[45] Date of Patent: Dec. 5, 2000

[54] COLOR-CONVERTED IMAGE FORMING APPARATUS

[75] Inventor: Tetsuya Iida, Hadano, Japan

[73] Assignee: Minolta Co., Ltd., Osaka, Japan

[21] Appl. No.: 08/313,577

[22] Filed: Sep. 27, 1994

[30] Foreign Application Priority Data

Oct. 13, 1993 [JP] Japan ................................. 5-256115

[51] Int. Cl.[7] .................................................. G06K 9/00
[52] U.S. Cl. ........................ 382/162; 382/165; 358/518
[58] Field of Search ............................. 382/41, 22, 165, 382/162; 358/310, 316, 335, 523, 515, 518; 348/496, 93, 655; 395/131; 345/154; 359/620; 350/518, 529

[56] References Cited

U.S. PATENT DOCUMENTS

| | | | |
|---|---|---|---|
| 4,590,511 | 5/1986 | Bocchi et al. | 348/93 |
| 4,622,582 | 11/1986 | Yamada | 358/523 |
| 4,679,074 | 7/1987 | Sugiura et al. | 358/523 |
| 4,745,467 | 5/1988 | Sekizawa et al. | 358/523 |
| 4,887,150 | 12/1989 | Chiba et al. | 358/523 |
| 5,088,050 | 2/1992 | Ito | 382/41 |
| 5,170,247 | 12/1992 | Takagi et al. | 348/655 |
| 5,311,336 | 5/1994 | Kurita et al. | 382/22 |
| 5,315,694 | 5/1994 | Kasano | 395/131 |
| 5,459,793 | 10/1995 | Naoi et al. | 382/165 |

FOREIGN PATENT DOCUMENTS

| | | | |
|---|---|---|---|
| 1-166669 | 6/1989 | Japan | H04N 1/46 |
| 4-51670 | 2/1992 | Japan | H04N 1/40 |

*Primary Examiner*—Jose L. Couso
*Assistant Examiner*—Anh Hong Do
*Attorney, Agent, or Firm*—Burns, Doane, Swecker & Mathis, LLP

[57] ABSTRACT

A color-converted image forming apparatus is disclosed which permits formation of a color conversion matrix for each of the input images and allows consequent production of an output image which has undergone desired conversion by a relatively simple operation. This apparatus stores image data introduced via an interface 11 in an image memory 13 and, at the same time, analyzes picture elements of an introduced image with a counter 12 to extract a plurality of characteristic magnitudes, and stores the results of the analysis in a characteristic magnitude memory 21. The extracted plurality of characteristic magnitudes are read out together with preset characteristic magnitudes of conversion into a coefficient arithmetic device 22, in which a coefficient for conversion is calculated from the data. The row of coefficients of conversion thus obtained by the calculation are stored in a coefficient row memory 23. A converting counter 14 sequentially reads image data out of the image memory 13 and imparts color conversion thereto with the aid of the row of coefficients for conversion stored in the coefficient row memory 23. The image data which have undergone the color conversion are emitted to a print mechanism 4. The characteristic magnitudes for conversion are stored in a ROM 32 and an IC card 41.

14 Claims, 5 Drawing Sheets

COLOR-CONVERTED IMAGE FORMING APPARATUS

BACKGROUND OF THE INVENTION

This invention relates to a color-converted image forming apparatus which enables an input image information to undergo the optimum color conversion up to a use's requirement by a relatively simple operation.

In recent years, in consequence of the advance of full-color output devices toward exaltation of performance, general users have come to hold increasingly exacting diverse demands on the images produced by the devices. In the field of the computer graphics, for example, various demands such as the demand for faithful reproduction on a hard copy of a color displayed on a monitor and the demand for reproduction of an original image in a color equivalent or superior to the color of the original image have been gaining in enthusiasm.

Various measures have been contemplated to date for the fulfillment of these demands. The technique disclosed in JP-A-01-166,669 is counted among these measures.

This technique comprises picking a multiplicity of picture elements as samples from an input image, subjecting the points of these samples to calorimetric analysis, deriving color-conversion matrixes from the results of the calorimetric analysis with the aid of the least squares method, storing in a device a multiplicity of color-conversion matrixes enough to produce colors desired by a user or as numerous color-conversion matrixes reflecting the characteristics of relevant input and output devices, and allowing the user to retrieve from the device a particular color-conversion matrix fit for a given occasion. The user is enabled to obtain a hard copy faithful to an image by selecting the fittest of the color-conversion matrixes stored in the device.

The technique which is disclosed in JP-A-04-51,670 is another example. This technique allows the masking coefficient which is required by a user in obtaining a hard copy faithful to an image to be determined by the solution of simultaneous equations based on representative colors designated on a test copy.

The conventional color-converted image forming apparatus of this class (refer to JP-A-01-166,669), however, are at a disadvantage in being incapable of producing hard copies which win the perfect satisfaction of all the users without fail because they are aimed at producing hard copies to be required in all likelihood by prospective users either by superposing color-conversion matrixes or consulting a lookup table having necessary color-conversion matrixes described in advance therein with respect to an input image.

Makers of color-converted image forming apparatuses, in preparing color-conversion matrixes, have no alternative but to adopt those of average magnitude so to speak in order that they may satisfy the majority of users to a certain extent. The degree of this satisfaction to be found in the apparatus loaded with a fixed collection of color-conversion matrixes, therefore, is different between users such as apparel makers who belong to fields possibly in need of special color-conversion matrixes and common users who are fully satisfied with ordinary color-conversion matrixes.

For the solution of this problem, the conventional techniques described above cause an output device to store as many color-conversion matrixes as possible or, where the output device has no sufficient capacity for the storage, cause such an external device as a host computer, for example, to store surplus color-conversion matrixes in such a manner as to be readily transferred to the output device. The collection of color-conversion matrixes so stored does not necessarily contain such color-conversion matrixes as are truly needed by users. Besides, the color-conversion matrixes thus stored pose the problem of setting users at difficulty in associating hard copies desired to be obtained with the color-conversion matrixes in storage.

For the solution of the problem just mentioned, the method which allows a conversion coefficient corresponding to a conversion being sought by a user to be determined by relying on the user to extract a test chart as an output, choose a number of colors out of the colors on the chromaticity coordinates in accordance with specific conditions, and solve simultaneous equations based on the colors so chosen and find a masking coefficient (refer to JP-A-04-51,670) has been proposed. This method, however, entails the inconvenience of compelling the user to designate on the test copy what is intended by the conversion under consideration. The method is indeed capable of producing a hard copy desired by the user and, nevertheless, is at a disadvantage in involving a complicated work for the acquisition of the masking coefficient.

SUMMARY OF THE INVENTION

An object of this invention is to provide a color-converted image forming apparatus which allows a user to select a desired conversion by a simple operation and attain convergence into a necessary conversion quickly.

Another object of this invention is to provide a color-converted image forming apparatus which allows production of conversion adapted for each of the input images to be introduced.

A further object of this invention is to provide a color-converted image forming apparatus which permits conversions fit for many images to be implemented even when the apparatus has only a space for accommodating one kind of data of conversion coefficients or data of lookup tables.

To accomplish the objects described above, this invention provides a color-converted image forming apparatus for effecting color conversion on input image data and producing the outcome of the color conversion, which comprises an input part for introducing image data, a memory part for storing the introduced image data, extracting means for analyzing the input image with respect to picture elements thereof and extracting a plurality of characteristic magnitudes, arithmetic means for computing a conversion coefficient based on the plurality of characteristic magnitudes extracted by the extracting means and characteristic magnitudes of conversion set in advance, conversion means for effecting conversion by sequentially reading out the image data already introduced and stored with the aid of a row of conversion coefficients calculated by the arithmetic means, and output means for producing image data converted by the conversion means.

To be specific, this invention, upon the theory that the change from an input image to a corresponding output image constitutes the very conversion being sought by a user, extracts and expresses the nature inherently embraced by the input image in terms of characteristic magnitudes of image, sorts the conversion desired by the user into certain component natures (atmosphere, tone, and memory color) in an easily comprehensible manner and retains the component natures in a form easily handled by the user (ROM cards or designation from a host computer), and allows the user by a simple operation to effect the addition of the relevant change to the characteristic magnitudes of the image and use the outcome of this addition as data for the solution of simultaneous equations necessary for the calculation of the masking coefficient for color conversion.

BRIEF DESCRIPTION OF THE DRAWINGS

The invention will be better understood and the objects and features thereof other than those set forth above will become apparent when consideration is given to the following detailed description thereof, which makes reference to the annexed drawings wherein.

DETAILED DESCRIPTION OF THE INVENTION

Now, embodiments of this invention will be described in detail below with reference to the accompanying drawings.

Figure 1:
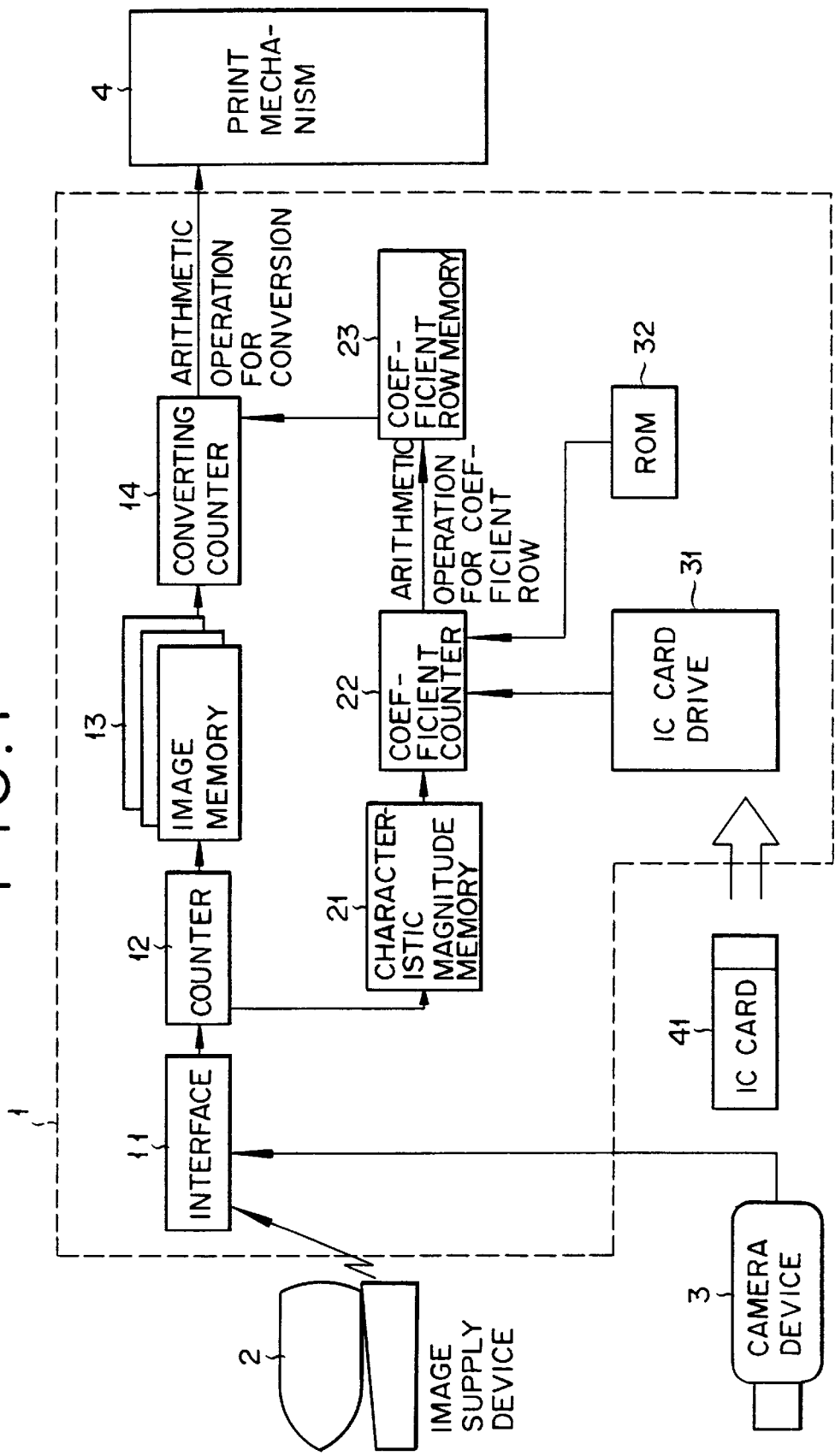
FIG. 1 is a schematic structural diagram of a color-converted image forming apparatus according to this invention.

FIG. 1 is a schematic structural diagram of a color-converted image forming apparatus of this invention which comprises a color converting device and peripheral devices thereof. As shown in this diagram, a color converting device 1 which forms the center of this invention is composed of the parts which are enclosed with a dotted line.

To an interface 11 are connected an image supply device 2 formed as of a host computer functioning as an image input device and a camera device 3 formed as of a CCD camera. This interface 11 is a general-purpose article such as, for example, a centronics which is used in a computer and is adapted to receive image information from the image supply device 2 and an analog video signal from the camera device 3.

A counter 12 serves to count the number of image data introduced via the interface 11. An image memory 13 serves to store temporarily the image data introduced via the interface 11. A conversion counter 14 serves to effect color conversion on the image data extracted from the image memory 13. The image data which has undergone the color conversion is delivered to a print mechanism 4 for producing a full-color hard copy. This print mechanism 4 and the conversion counter 14 are interconnected through the medium of a high-speed interface formed of three parallelly arranged 8-bit parallel outputs.

A characteristic magnitude memory 21 serves to memorize the count data produced from the counter 12. A coefficient counter 22 serves to calculate the coefficient of color conversion based on the data for calculation of color-conversion coefficient stored in a ROM 32. To this coefficient counter 22 is connected to a portable memory medium drive, such as an IC card drive 31. This IC card drive 31 may be used for directly reading data for color conversion from such a portable recording medium 41 as the IC card which stores the data for color conversion. The coefficient determined by the coefficient counter 22 is stored by a coefficient row memory 23.

The color-converted image forming apparatus of the present invention which is constructed as described above implements the processing of color conversion roughly as follows.

It is assumed here that the image information to be handled in the color converting device 1 is composed of three independent kinds of color information expressible as specific coloring systems. Here, the system of forming one unit color byte (256 expressible intensity levels) with what is called the RGB coloring system formed of the colors of red, green, and blue and used as in a color monitor is assumed.

The image information, in one way, is transferred from the image supply device 2 via a general-purpose interface line to the interface 11. The interface 11 examines the incoming information to discriminate between image information and command information and, on finding the information to be of the former type, forwards the information to the counter 12. Alternatively, when the image information transmitted from the camera device 3 is to be received, the interface 11 requires an A/D converter because the image information is in the form of an analog signal. The counter 12 counts all the image information to be received and extracts the points of maximum amounts of component of each of the eight basic colors to be specifically described hereinbelow and the points of centers of color gravity of all the image information.

The image information which has been counted is then written in the image memory 13 and stored therein for a while. In the meantime, the points of maximum amounts of components of the eight basic colors and the points of centers of color gravity in all the image information which have been extracted by the counter 12 are forwarded as characteristic points inherent in the input image to the characteristic magnitude memory 21 and stored therein. They are read out of this memory 21 as occasion demands and are used by the coefficient counter 22 for the calculation of the coefficient for color conversion together with the information for calculation of the color-conversion coefficient supplied from the IC card drive 31 or the ROM 32. The information for the calculation of the coefficient of color conversion from the IC card drive 31 describes the amounts of change in the amounts of intrinsic components of color conversion aimed at by an operator. The IC card 41 as a unit contains such amounts of change. These amounts of change are read out each time the IC card 41 is inserted in the IC card drive 31 and are forwarded to the coefficient counter 22. The information for the calculation of the coefficient of color conversion from the ROM 32 is the intrinsic information owned by the print mechanism 4 which is connected and the information describes the relation between the color information of the output image and the amounts of change. This information is likewise read out as occasion demands and forwarded to the coefficient counter 22 and used therein for the calculation of the coefficient of color conversion.

The coefficient counter 22 calculates the coefficient of color conversion by utilizing the information described above. This invention contemplates deriving a color-conversion matrix of three rows by 10 columns and acquires 30 color-conversion coefficients by solving simultaneous linear equations of real coefficient based on the set of the points of maximum amounts of components of an input image to be previously obtained and the points resulting from the accumulation of the amounts of change thereof. The rows of color-conversion coefficients obtained as described above are transferred to the coefficient row memory 23 and stored therein. When the action of output is started by an external command or in consequence of the completion of the calculation of the coefficient of color conversion, the image information is sequentially read out of the image memory 13 and delivered to the conversion counter 14. The conversion counter 14 performs an arithmetic operation for color conversion on the introduced image information with the aid of the rows of coefficients stored in the coefficient row memory 23. The image information which has undergone the color conversion is forwarded to the print mechanism 4 and recorded on a recording paper.

The description given thus far represents a case of effecting conversion on the color of the output image by the detection of characteristic magnitudes concerning color. Besides the matrix operation described above, the method which effects conversion of space frequency on the colors of specific regions may be used. This method necessitates selection of the colors to be subjected to the conversion. This selection may be implemented by a method which attains the selection in accordance with the magnitudes of amounts of conversion determined by a matrix operation or a method which attains the selection in accordance with the magnitudes of input determined by the characteristics of the print mechanism 4 relative to the memorized colors. Without reference to the kind of method to be adopted for the selection, the soft focus effect can be obtained on the selected input image by lowering the higher parts of the space frequency. Conversely, the edge effect can be obtained by heightening the lower parts of the space frequency. For example, an image may be obtained as an ideal portrait manifesting the soft focus effect by selecting the color of skin from the memorized colors and lowering the higher parts of the space frequency.

Figure 2:
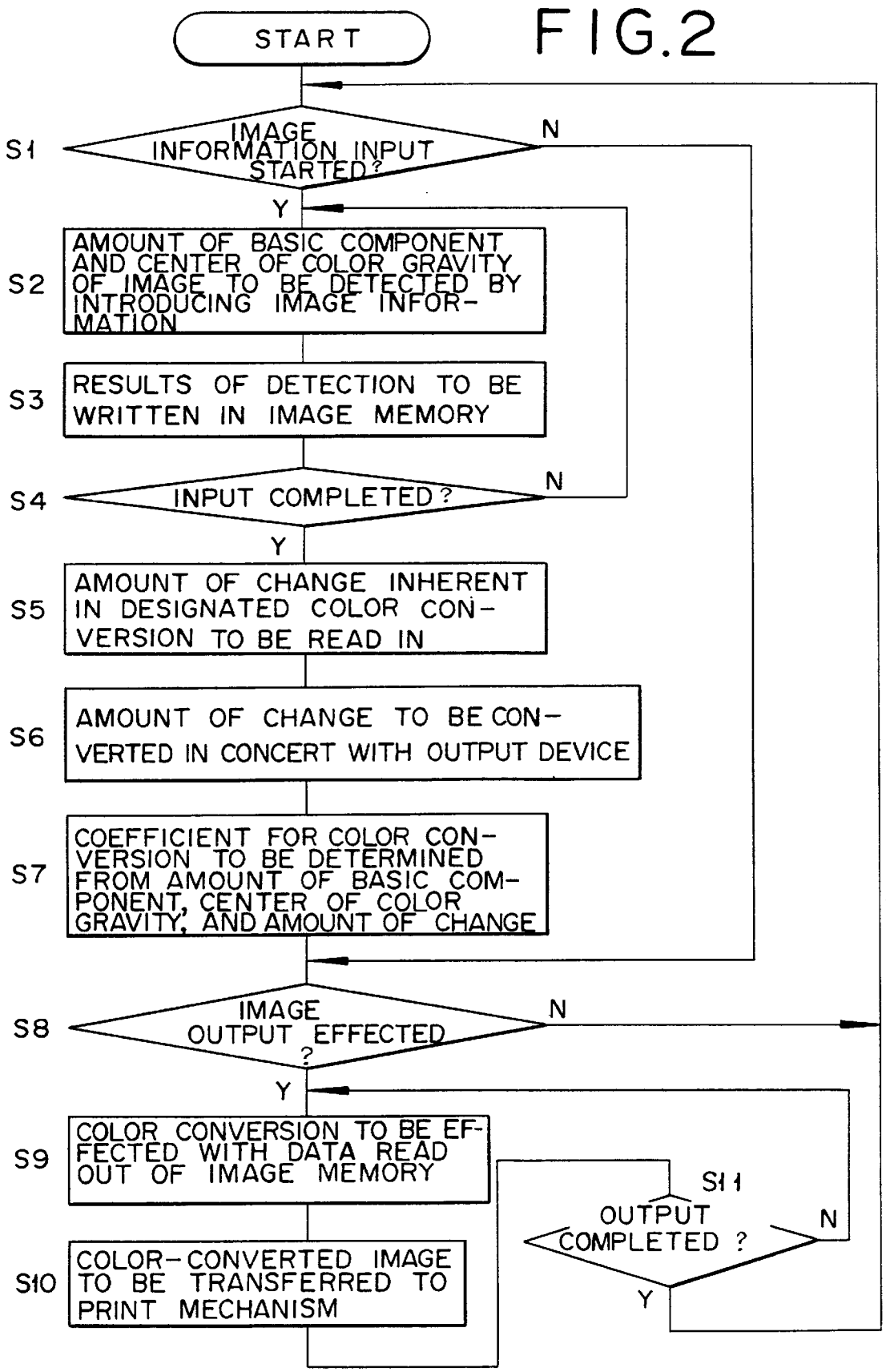
FIG. 2 is a flow chart showing the operation of the apparatus shown in FIG. 1.

Now, the operation of the color-converted image forming apparatus of this invention will be described below with reference to the flow chart of FIG. 2.

When the power source for the apparatus is turned on, the apparatus resets all the component parts thereof and decides whether or not the input of image information has been started. The detection of the start of the input of image information is attained either by checking whether or not the input signal has entered the port on the interface 11 by means of polling or by effecting an interruption with an input signal (S1).

When the absence of input of image information is detected at the step S1, the apparatus decides whether or not an image has been produced as an output. This decision is implemented by the emission of a command to produce an image as an output, by the detection of the command to produce the image owing to the operation of a front panel, or by the detection of the completion of the operation of color conversion when the apparatus is in the mode of immediately issuing an output on completion of the operation of color conversion (S8). The procedure described thus far is repeated when neither the start of input of image information nor the output of image is detected.

When the input of image information is started, the image information which has been introduced into the interface 11 is forwarded to the counter 12, in which all the image information is subjected to comparison or addition to effect the detection of maximum amounts of basic components and centers of color gravity of the image. These characteristic magnitudes which have been detected are stored in the characteristic magnitude memory 21.

To be specific, the maximum amounts of basic components are determined as follows.

This invention uses a masking matrix of three rows by 10 columns. In other words, sets of 10 input colors and 10 output colors are used.

The selection of input colors is accomplished by obtaining the following eight amounts within a given input image by the use of all the colors in the input image.

Point of maximum amount of red component . . . Most intensely reddish color in the image Point of maximum amount of green component . . . Most intensely greenish color in the image Point of maximum amount of blue component . . . Most intensely bluish color in the image Point of maximum amount of cyan component . . . Most intensely blue greenish color in the image Point of maximum amount of magenta component . . . Most intensely red purplish color in the image Point of maximum amount of yellow component . . . Most intensely yellowish color in the image Point of maximum amount of white component . . . Brightest color in the image Point of maximum amount of black component . . . Darkest color in the image The expression "most intensely . . . ish color" as used herein is defined as a color which combines the requirement that the difference between the main color component of the relevant color and the other color component should assume the largest positive number and the requirement that the difference between the color components other than the main color component should be minimum. For better comprehension of this definition, the expression, letting $C(x_1, x_2, x_3)_{max}$ stand for the point of maximum amount of component (the case of involving three color components), is formularized as follows.

$$C(x_1, x_2, x_3)_{max} = \{2x_{main\ component} - (\Sigma x_{other\ than\ main\ component}) - ABS(DIF(x_{other\ than\ main\ component}))\}_{max}$$

wherein ABS stands for the function for determination of absolute value and DIF for the function for determination of difference.

The rgb (red, green, blue) data of the point of maximum amount of a relevant component mentioned above, therefore, can be obtained by applying the following formula to the rgb information of the same point (image element).

Point of maximum amount of red component:

$$R(r, g, b)_{max} = \{2r - (g+b) - ABS(g-b)\}_{max}$$

Point of maximum amount of green component:

$$G(r, g, b)_{max} = \{2g - (r+b) - ABS(r-b)\}_{max}$$

Point of maximum amount of blue component:

$$B(r, g, b)_{max} = \{2b - (r+g) - ABS(r-g)\}_{max}$$

Point of maximum amount of cyan component:

$$C(r, g, b)_{max} = \{(g+b) - 2r - ABS(g-b)\}_{max}$$

Point of maximum amount of magenta component:

$$M(r, g, b)_{max} = \{(r+b) - 2g - ABS(r-b)\}_{max}$$

Point of maximum amount of yellow component:

$$Y(r, g, b)_{max} = \{(r+g) - 2b - ABS(r-g)\}_{max}$$

Point of maximum amount of white component:

$$W(r, g, b)_{max}=\{r+g+b\}_{max}$$

Point of maximum amount of black component:

$$K(r, g, b)_{max}=\{r+g+b\}_{min}$$

wherein ABS(x-y) stands for the absolute value of the difference between the two variables, $\{f(a, b, c)\}_{max}$ for the combination of a, b, and c when the formula assumes the maximum value, and $\{f(a, b, c)\}_{min}$ for the combination of a, b, and c when the formula assumes the minimum value.

When a plurality of combinations of (r, g, b) exist as the maximum amount of component of each color, the combination of (r, g, b) which has the most picture elements in number is used as the maximum amount of component of that color. For example, when the maximum amount of red component is 358 but a combination of (194,63,75) and a combination of (200,81,81) exist, either of the combinations which has more picture elements in number is used as the maximum amount of red component.

To be specific, the center of color gravity of an image is determined as follows.

The point of gravity of an input image is obtained by using all the colors present in the input image. The center of gravity is defined by the average value of the whole data of the input image as sorted into color components. Let G stand for the point of gravity, and the rgb data of the point of gravity is obtained in the form of the average value of the whole data of each of the colors involved by the following formula.

$$G(r, g, b)=((\Sigma r)/n, (\Sigma g)/n, (\Sigma b)/n)$$

wherein n stands for the number of pieces of the whole data (The operation under consideration constitutes Step S2).

The image information which has passed through the counter 12 is written in the order of arrangement thereof into the image memory 13 which has a capacity for one image plane (S3). The procedure described above is repeated until the transmission of one image plane full of data is completed or the signal indicating completion of the transmission of image information is received (S4).

When the completion of the introduction of image information is discerned at the step S4, the coefficient counter 22 reads in a change on the chromaticity coordinates system corresponding to the designated color conversion from the portable recording medium 41 such as the IC card, from the host computer 2 via the interface 11, or in response to the manual operation of relevant implements on the front panel (S5).

Then, it proceeds to read in, from the ROM 32, from the host computer 2 via the interface 11, or in response to the manual operation of relevant implements on the front panel, the formula of conversion or the table of conversion for converting the change read in at the step S5 into the coordinates system possessed by the characteristic magnitudes obtained from the input image information in consideration of the output characteristics of the print mechanism 4 and effects the conversion of the change based on the formula of conversion or the table of conversion (S6).

Subsequently, the coefficient counter 22 solves the simultaneous linear equations using the maximum amount of basic component and the center of color gravity stored in the characteristic magnitude memory 21 and the change obtained at the steps S5 and S6 to determine the coefficient of color conversion.

To be specific, the coefficient of color conversion is determined as follows.

Here, from such factors as the amount of basic component found at the step S2, the nonlinear conversion coefficient for converting the input color space f(r, g, b) into the output color space f'(r, g, b) is obtained.

The phenomenon of under color fogging is prevented by using the matrix of three rows by 10 columns including even the cubic term as the matrix for color conversion and by exalting the gravity near the white point. This color conversion matrix is given by the following formula.

$$\begin{pmatrix} R' \\ G' \\ B' \end{pmatrix} = \begin{pmatrix} a11 & a12 & a13 & a14 & a15 & a16 & a17 & a18 & a19 & a110 \\ a21 & a22 & a23 & a24 & a25 & a26 & a27 & a28 & a29 & a210 \\ a31 & a32 & a33 & a34 & a35 & a36 & a37 & a38 & a39 & a310 \end{pmatrix} \begin{pmatrix} R \\ G \\ B \\ R^2 \\ G^2 \\ B^2 \\ RG \\ GB \\ BR \\ RGB \end{pmatrix}$$

Here, the constant for calculation is given as follows.

First, as the set of input points, the following points of maximum amounts of components which have been extracted in advance are used.

Point of maximum amount of red component . . . $R(r, g, b)_{max}$

Point of maximum amount of green component . . . $G(r, g, b)_{max}$

Point of maximum amount of blue component . . . $B(r, g, b)_{max}$

Point of maximum amount of cyan component $C(r, g, b)_{max}$

Point of maximum amount of magenta component . . . $M(r, g, b)_{max}$

Point of maximum amount of yellow component . . . $Y(r, g, b)_{max}$

Point of maximum amount of white component . . . $W(r, g, b)_{max}$

Since these factors are not sufficient for the immediate purpose, the midpoint between the point of maximum amount of red component and the point of white color, the midpoint between the point of maximum amount of green component and the point of white color, and the midpoint between the point of maximum amount of blue component and the point of white color, namely the sums severally of the point of maximum amount of red component, the point of maximum amount of green component, and the point of maximum amount of blue component plus the half (½) values of the differences from the relevant maximum amounts of component color, are used. Incidentally, the point of maximum amount of black component, $K(r, g, b)_{max}$, is not used for the determination of the constant for calculation but is used with respect to the change of the output point which will be specifically described herein below.

Then, the set of output points is given. Here, the sums severally of the (r, g, b) values of the points of input plus the relevant changes are used as the set of output points to suit the purpose of color conversion. Thus, the following formula is consequently derived.

$$r'=r+\Delta r$$

$$g'=g+\Delta g$$

$$b'=b+\Delta b$$

The simultaneous linear equations of real coefficients of three 10-variable real coefficients derived from the sets of the aforementioned input points and output points determined as described above are solved by a suitable method (such as, for example, Gauss-Jordan elimination) to find the coefficient for color variation.

Here, the "amount of change," the magnitude which determines color variation, will be described.

The color variation can be classified by the expression easily comprehensible by the operator of the apparatus into the four kinds, i.e. conversion of atmosphere, conversion of tone, conversion of memorized color, and conversion of designated color.

The conversion of atmosphere consists in the desire to translate an input image as a whole in one fixed direction and, therefore, is implemented by an operation which comprises deriving the points of gravity of a desired output image from the color of a light source of the output image, finding differences of each color component between the points of gravity of an input image and the points of gravity of the output image, and adding the differences as amounts of change to all the magnitudes of input.

Specifically, since the atmosphere of an image is determined by a light source set on the image, the relation of the color temperature with the input data by the print mechanism 4 is studied in advance and the conversion table or the conversion formula consequently obtained is put to storage in the ROM 32. The IC card 41 has color temperatures and colors of light source stored therein.

Procedurally, after the color temperature and the color of light source have been retrieved from the IC card 41, the ROM 32 operates to find the center of gravity of the designated output image. Then, the difference of this center of gravity from the center of gravity of the input image stored in the characteristic magnitude memory 21 is found. This difference is adopted as the amount of change $\Delta A(r, g, b)$ due to the change of atmosphere.

The conversion of tone consists in the desire to brighten or darken an output image in its entirety or to increase or decrease the number of colors of expression and, therefore, is implemented by an operation which comprises deriving the points of gravity of the output image and the amounts of increase or decrease of the relevant maximum amounts of components from the intensity of light source of a desired output image and the number of colors of expression and adding the differences of color component between the points of gravity of the input image and the points of gravity of the output image and the amounts of increase or decrease of the maximum amounts of relevant component to the input values.

Specifically, the tone of an image is determined by the intensity of a light source set on the image and the number of colors of expression. Thus, the relation of the intensity of light source with the input data and the relation between the range of normalized colors of expression and the number of colors of expression by the print mechanism 4 are stored in the form of a conversion table or a conversion formula in the ROM 32. The IC card 41 has stored therein the intensity of light source and the range of colors of expression.

Procedurally, after the intensity of light source and the range of colors of expression have been retrieved from the IC card 41, the ROM 32 operates to find the amount of shift in the direction of lightness and the value of increase or decrease of the number of colors of expression. These are adopted as relevant amounts of change $\Delta L(r,g,b)$ and $\Delta N(r, g,b)$.

The conversion of memorized color consists in the desire to change the colors of such things as skin, blue sky, hair, lawn, green leaves, and ground which are so frequently viewed in everyday life as to be readily perceived when their designations are pronounced and, therefore, is implemented by an operation which comprises determining the differences between the central chromaticities of memorized colors in a desired output image and the central chromaticities of memorized colors in an input image and adding these differences to the input values exclusively with respect to the amounts of components in which the positions of the relevant central chromaticities assume positive numbers within the spaces of the relevant amounts of components.

Specifically, since the chromaticities of memorized colors are determined by an organoleptic test performed with numerous human volunteers, the relation of the chromaticity with the input data by the print mechanism 4 is stored in advance in the form of a conversion table or a conversion formula in the ROM 32. The IC card has stored therein the differences between the chromaticities of designated memorized colors and those of standard memorized colors.

Procedurally, after chromaticities of designated memorized colors have been retrieved from the IC card 41, the ROM 32 operates to convert these chromaticities into (r, g, b) data and add the amounts of change with respect to only the relevant items of the constant for the calculation of color conversion which are taken charge of by the amounts of components of the memorized colors falling in the areas in which the amounts of components assume positive numbers. These amounts of change are adopted as amounts of change $\Delta M(r, g, b)$ due to conversion of memorized colors. The amount of white component is omitted.

The conversion of a designated color consists in the desire to effect variation in a specific color in an input image (only one color in all the colors possessed by the input image). Since the conversion is carried out on a single color of the input, it does not need to rely on this invention. This invention, therefore, pays no consideration to this particular conversion.

The operations described above produce the necessary "amounts of change". The set of output points are eventually given by the following formula.

$$r'=r*(1+\Delta Ar+\Delta Lr+\Delta Nr+[\Delta Mr])$$

$$g'=g*(1+\Delta Ag+\Delta Lg+\Delta Ng+[\Delta Mg])$$

$$b'=b*(1+\Delta Ab+\Delta Lb+\Delta Nb+[\Delta Mb])$$

It is provided that $[\Delta M]$ has only limited uses as already pointed out (the operation described above constitutes the step S7).

When an image output is detected at the step S8, the conversion counter 14 reads image information sequentially in the order of its arrangement from the image memory 13 which stores the image information and effects color conversion sequentially thereon with the coefficient of color conversion obtained at the step S7 and stored in the coefficient row memory 23 (S9). The image information which has undergone the color conversion is transferred to the print mechanism 4 in conformity with the operating timing of the print mechanism 4 (S10). The steps of S9 and S10 are repeated until they have been completely performed on the image information of one image plane, until the signal indicating the completion of the steps is introduced via the interface 11 from the host computer 2, or until a command for terminating the steps is issued by the manual operation of proper implements on the front panel (S11).

Figure 3:
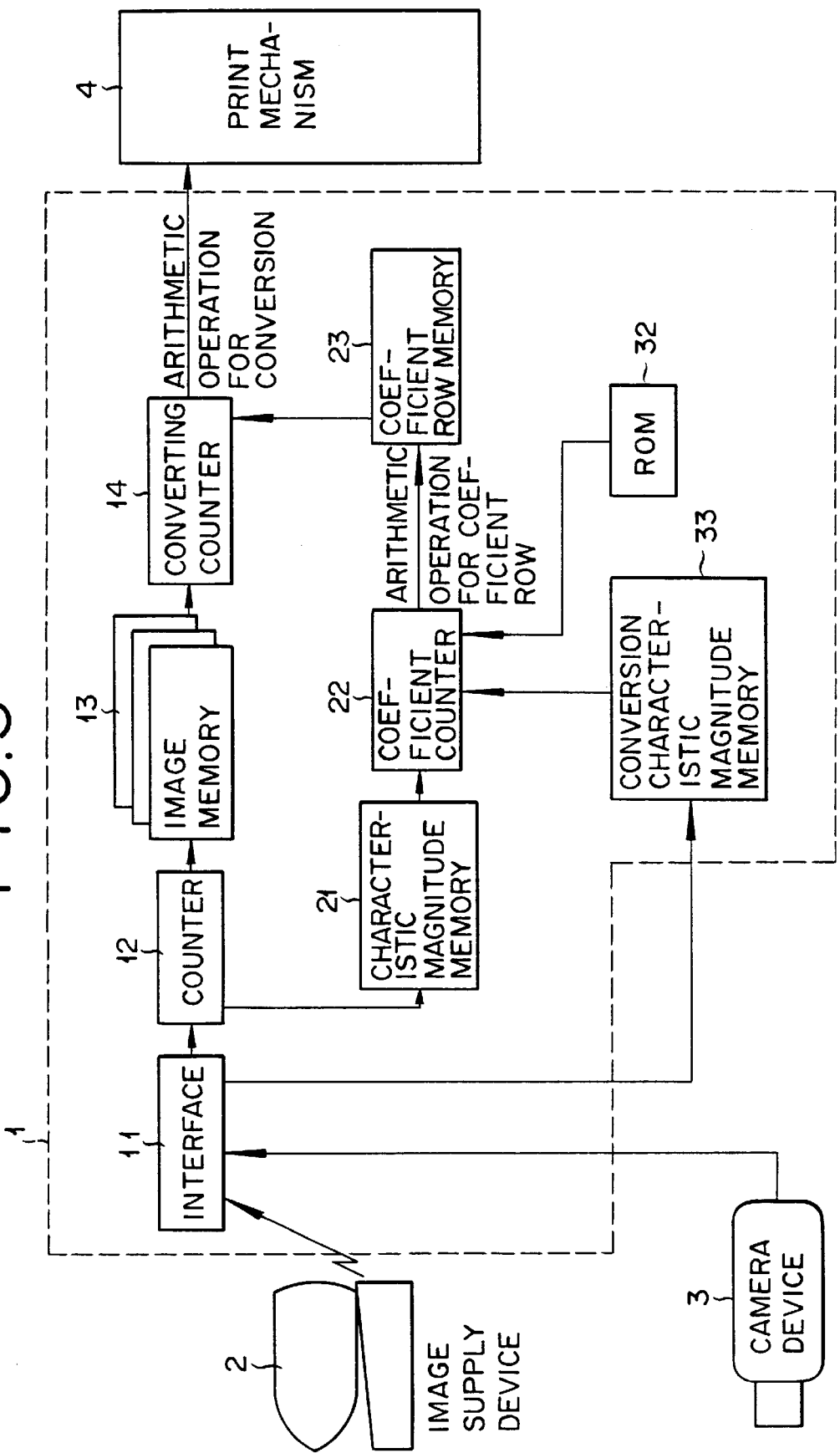
FIG. 3 is a schematic structural diagram of a color-converted image forming apparatus as a second embodiment of this invention.

FIG. 3 shows an apparatus which is provided with a conversion characteristic magnitude memory 33 which takes the place of the IC card drive 31 shown in FIG. 1. The other components of the construction of this apparatus and the functions thereof are completely identical with those of the apparatus shown in FIG. 1. Thus, these components and functions will be omitted from the following description.

The conversion characteristic magnitude memory 33 is a memory for memorizing the conversion characteristics which are introduced via the interface 11 from the image supply device 2. It is so adapted as to allow the conversion characteristics memorized therein to be read out and then forwarded to the coefficient counter 22 each time a command is issued from the image supply device 2. The conversion characteristic magnitude memory 33 admits for storage therein the incoming information only when this information concerns a conversion characteristic magnitude. The other operations to be performed by this apparatus are completely identical with those of the apparatus shown in FIG. 1.

Figure 4:
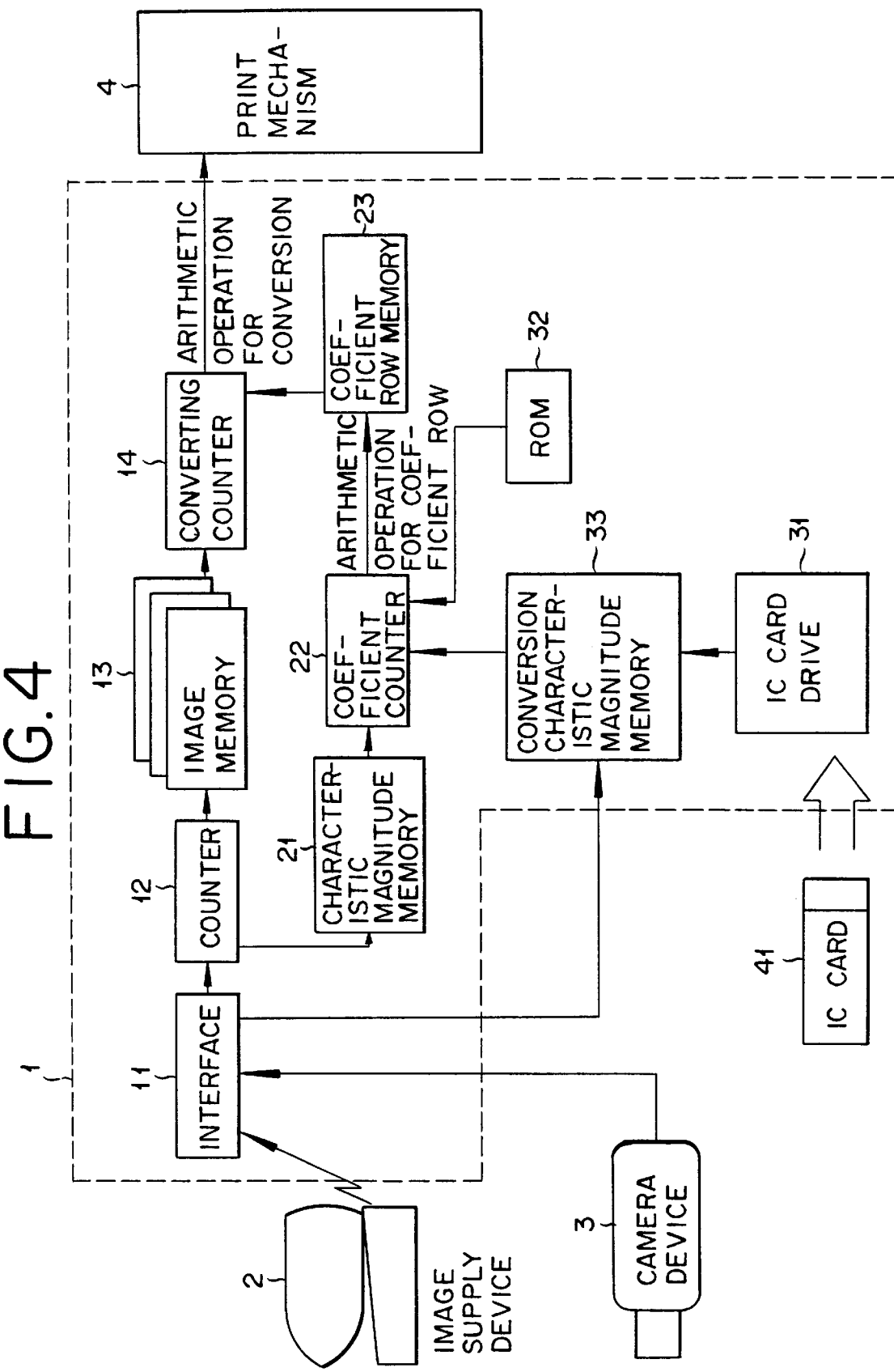
FIG. 4 is a schematic structural diagram of a color-converted image forming apparatus as a third embodiment of this invention.

An apparatus shown in FIG. 4 is so constructed as to combine the features of the apparatus shown in FIG. 1 with those of the apparatus shown in FIG. 3. It is so adapted as to utilize either the command or the selection switch (not shown) incorporated in the apparatus proper for the purpose of deciding whether the information from the IC card drive 31 and the conversion characteristic amount from the conversion characteristic amount memory 33 are to be used selectively or jointly. The operation of this apparatus to be produced when the IC card drive 31 or the conversion characteristic amount memory 33 is used is completely identical with that described above. Thus, the description of this operation will be omitted from the description.

Now, a concrete example of the case of converting only the skin color of a portrait by the use of the color-converted image forming apparatus of this invention which operates as described above will be explained below.

First, an IC card to be used exclusively for the conversion of skin color is prepared and set in the IC card drive 31. As an input image, a portrait of an ordinary skin color photographed in a studio is used. As an output image, the portrait of a sunburnt skin color is desired.

The central value (r, g, b) of the ordinary skin color with the output device used in the apparatus is (255, 213, 213) and the central value (r, g, b) of the designated skin color is (231, 129, 129).

At this position, the amount of red component, the amount of yellow component, the amount of magenta component, and the amount of white component are affected by the amount of change. Since the amount of white component is omitted as described above in connection with the conversion of memorized colors, the actual set of constants for the calculation of the coefficient of color conversion is as shown in Table 1.

TABLE 1

| NO. | Input value | Output value |
|---|---|---|
| 1 | maximum amount of red component | input value + ΔM |
| 2 | maximum amount of green component | input value |
| 3 | maximum amount of blue component | input value |
| 4 | maximum amount of red component + (maximum amount of component color − maximum amount of red component)/2 | input value + ΔM |
| 5 | maximum amount of green component + (maximum amount of component color − maximum amount of green component)/2 | input value |
| 6 | maximum amount of blue component + (maximum amount of component color − maximum amount of blue component)/2 | input value |
| 7 | maximum amount of yellow component | input value + ΔM |
| 8 | maximum amount of cyan component | input value |
| 9 | maximum amount of magenta component | input value + ΔM |
| 10 | maximum amount of white component | input value |

When the input image is subjected to color conversion using the coefficient for color conversion obtained by the solution of the set of constants mentioned above, the skin of the human figure in the output image has a sunburnt color.

Now, another example of the color conversion according to this invention will be cited below with respect to the procedure for approximating an image emitted from the output device to the color of an image displayed on a monitor. When images are to be handled with a host system, the image produced from the output device is desired to have a color approximating the color of the image displayed on the monitor used in the system because the color of the image displayed on the monitor frequently forms the standard. It is now assumed that the image under consideration is in the form of a portrait.

First, the maximum amounts of components are applied to the relevant formulas to obtain the following results.

|  | R | G | B |
|---|---|---|---|
| Maximum amount of red component | (194, | 63, | 75) |
| Maximum amount of green component | (78, | 176, | 134) |
| Maximum amount of blue component | (26, | 68, | 253) |
| Maximum amount of cyan component | (99, | 203, | 201) |
| Maximum amount of magenta component | (254, | 154, | 219) |
| Maximum amount of yellow component | (224, | 191, | 149) |
| Maximum amount of white component | (255, | 255, | 255) |
| Maximum amount of black component | (0, | 0, | 0) |

Then, the conversion necessary for approximating the color of the output image to the color of the monitor (CRT) is set. It is now assumed that this conversion concerns the "conversion of tone" in the three kinds of conversion mentioned above. Thus, 1. To brighten the image. $\Delta L(r, g, b)$
2. To heighten the lightness as a whole. $\Delta N_t(r, g, b)$
3. To shift the red color to magenta. $\Delta N_r(r, g, b)$
   To shift the blue color to cyan. $\Delta N_b(r, g, b)$
   To decrease the yellow color. $\Delta N_y(r, g, b)$ Thus, the following formula is established.

Output value Input value+$\Delta L(r, g, b)$+$\Delta N_t(r, g, b)$+$\Delta N_r(r, g, b)$+$\Delta N_b(r, g, b)$+$\Delta N_y(r, g, b)$ Subsequently, 30 formulas are derived by applying the combinations of ten pairs of input value and output value to the formula shown above.

Then, the coefficient of conversion is obtained by solving the equations by a suitable method such as, for example, the Gauss-Jordan elimination. The results are as shown below.

$A_1$=(1.39, −0.1741, −0.1713, −2.399E−4, −8.284E−6, 5.744E−4, 2.513E−4, 1.266E−3, −1.635E−3, −9.05E−7)

$A_2$=(−0.4461, 0.6008, 1.044, 1.708E−3, 4.212E−3, −2.43E−3, −1.737E−3, −3.168E−3, −7.651E−5, 3.701E−6)

$A_3$=(0.34, −0.3864, 0.8185, −2.201E−3, −2.691E−4, 4.627E−4, 3.842E−3. 1.651E−3, 1.311E−3, −1.422E−5)

wherein $$\text{Output} \begin{pmatrix} R \\ G \\ B \end{pmatrix} = \begin{pmatrix} A_1 \\ A_2 \\ A_3 \end{pmatrix} \text{Input} \begin{pmatrix} R \\ G \\ B \\ R^2 \\ G^2 \\ B^2 \\ RG \\ GB \\ BR \\ RGB \end{pmatrix}$$

The results of the simulation are as follows.

| Input value | | Output value |
|---|---|---|
| (255, 255, 255) | → | (265, 270, 273) |
| (220, 220, 220) | → | (230, 231, 250) |
| (100, 100, 100) | → | (106, 109, 111) |
| (50, 50, 50) | → | (53, 57, 49) |
| (220, 100, 100) | → | (246, 103, 112) |
| (220, 50, 50) | → | (266, 45, 43) |
| (100, 220, 100) | → | (102, 288, 103) |
| (50, 220, 50) | → | (35, 312, 11) |
| (100, 100, 220) | → | (102, 106, 245) |
| (50, 50, 220) | → | (46, 97, 228) |
| (220, 220, 100) | → | (244, 263, 139) |
| (220, 220, 50) | → | (254, 256, 96) |
| (220, 100, 220) | → | (217, 105, 245) |
| (220, 50, 220) | → | (211, 88, 240) |
| (100, 220, 220) | → | (115, 245, 241) |
| (50, 220, 220) | → | (64, 266, 218) |

When the coefficient of correction is sought with respect to another image of a fruit, for example, the approximation of the color of this image to that of the image on the monitor by the same procedure as described above produces the following results.

$A_1$=(1.123, −0.08433, 0.0442, −1.732E−4, 2.249E−4, −1.401E−4, −2.847E−4, 1.737E−4, −4.972E−4, 2.066E−6)

$A_2$=(−0.1471, 0.6814, 0.8591, 7.986E−4, 2.573E−3, −2.763E−3, −6.869E−4, −1.562E−3, −1.104E−3, 6.03E−6)

$A_3$=(−0.06278, −0.3117, 1.45, 2.88E−4, 1.54E−3, 3.989E−4, 4.77E−5, −1.743E−3, 3.177E−4, −2.721E−7)

As described above, this procedure allows formation of an optimum coefficient of correction for each of the images to be introduced for the sake of the correction which is intended by the user.

This invention obviates the necessity of using a device for determining the state of an input image as described above and, therefore, permits a proportional cut in the cost of production of the apparatus. It also obviates the necessity of having modules incorporated in the apparatus for the determination of density which will be found necessary in the process of development. It further avoids imposing the requirement that an input image should contain a designated lattice point or a color approximating it. It further avoids selecting input images and obviates the necessity of exclusively utilizing image outputs for determining a masking coefficient by the use of a test chart.

This invention allows formation of a conversion matrix for each of the input images and consequent emission of products of the conversion as outputs. Further, it enables matrixes proper for desired conversions to be formed as shifted for the images once introduced as inputs simply by exchanging ROMs. Besides, eight maximum amounts of components and centers of gravity suffice as parameters (amounts to be extracted from the input image) which are necessary for the determination of a masking coefficient for color conversion.

The working examples under consideration represents a case of effecting color conversion by the reading of the data described in the IC card. The present invention is not limited to this example. This invention may be alternatively embodied by causing the same data as written in the IC card to be supplied on line from a host computer or by causing the data to be formed by the operation of relevant implements on the front panel. This invention also enables the color conversion to be effected with respect to memorized colors by the use of a circuit or software adapted to effect changes in the space frequency characteristics.

The apparatus has been described as handling image information having a data width of 8 bits. Of course, it is optional with the manufacturer to use image information of other data width.

As respects the object of analysis of an input image, the present example forms a case of extracting characteristic points by analyzing all the picture elements to be involved. This invention does not need to be limited to this case. The extraction may be otherwise attained by analyzing one out of every 10 picture elements, for example. This example subjects the entire area of a given image to analysis. Alternatively, the present invention may effect this analysis on picture elements in a specific area of a given image.

Figure 5:
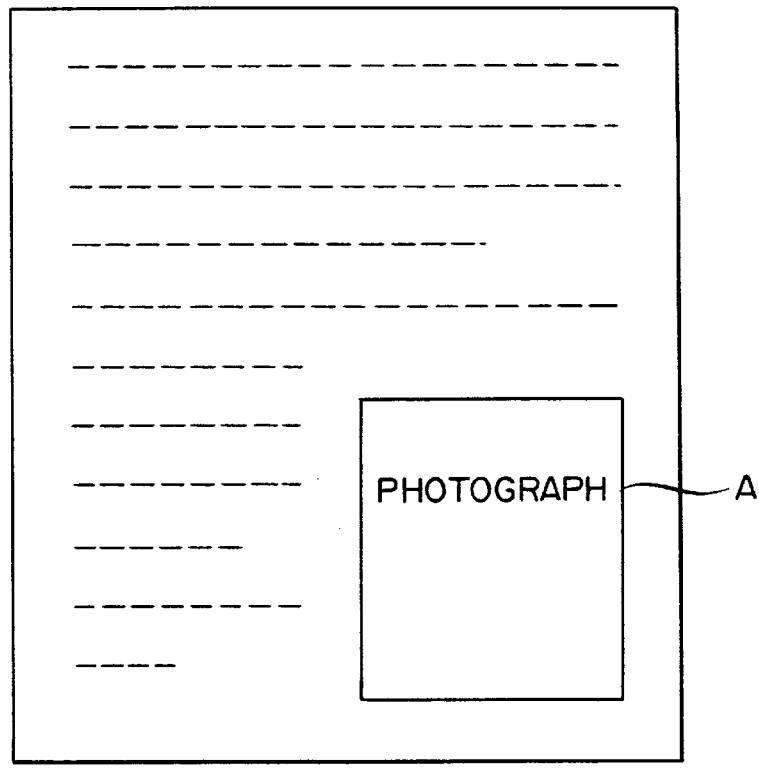
FIG. 5 and FIG. 6 severally are explanatory diagrams of other embodiments with respect to subjects of conversion of image data.
Figure 6:
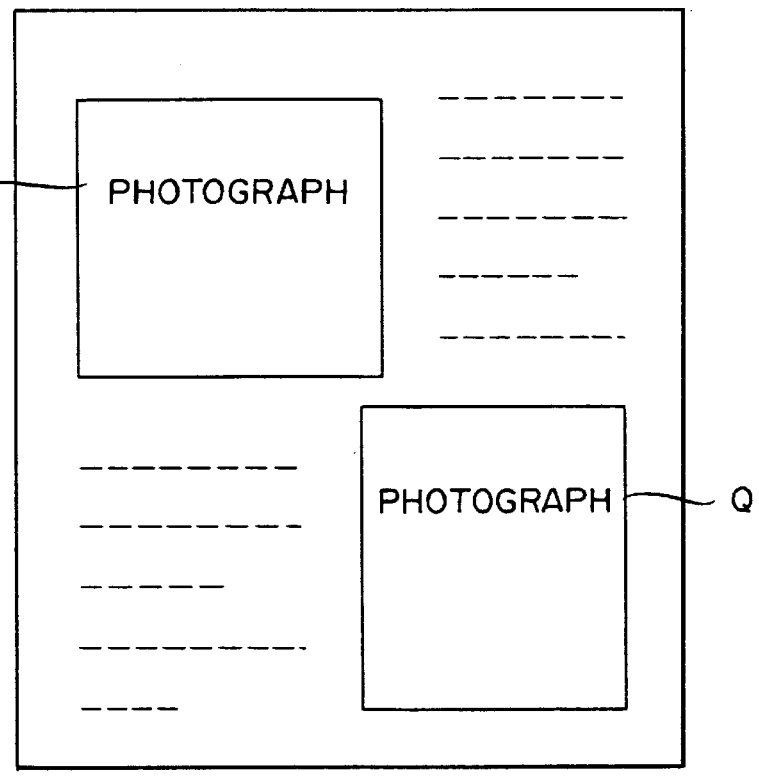

Further, as respects the object of conversion of image data, the present example effects conversion on the picture elements in the entire area of a given image. This invention does not need to be limited to this case. It may be alternatively embodied so as to effect conversion exclusively on picture elements in a specific area as illustrated in FIG. 5 and FIG. 6. In this case, the characteristic points are extracted by analyzing only the picture elements in the area which is subjected to the conversion of an image. In the case of the example of FIG. 5, a specific area A (such as, for example, a photograph) is exclusively designated and this area is subjected to a specific image data conversion. In the case of the example of FIG. 6, specific areas P and Q (such as, for example, two photographs) are designated and these areas are subjected to image data conversion. In this case, the modes of conversion may be different in the two specific areas P and Q (namely different sorts of information may be used for calculation of the coefficient for color conversion).

While there have been shown and described the present preferred embodiments of this invention, it is to be distinctly understood that the invention is not limited thereto but may be otherwise variously embodied and practiced within the scope of the following claims.

What is claimed is:

1. An image processing apparatus for effecting color conversion of input image data and producing an outcome of said color conversion, which apparatus comprises:

an image input part for introducing image data;

a memory part for storing said introduced image data;

extracting means for analyzing the input image data and extracting a plurality of characteristic magnitudes relating to color tone from said input image;

input means for inputting information relating to an amount of change of a color component in the color conversion;

arithmetic means for computing a conversion coefficient based on the plurality of characteristic magnitudes extracted by said extracting means and the information inputted by said input means;

conversion means for effecting conversion by sequentially reading out the image data already introduced and stored with the aid of conversion coefficients calculated by said arithmetic means; and output means for producing image data converted by said conversion means.

2. The image processing apparatus according to claim 1, wherein said extracting means extracts different types of characteristic magnitudes to permit calculation of the conversion coefficient.

3. The image processing apparatus according to claim 1, wherein said characteristic magnitudes are obtained from at least one of a value of color tones including red, green, blue, cyan, magenta, yellow, white, and black which are main components in a color space and centers of color gravity of an input image.

4. The image processing apparatus according to claim 1, wherein said apparatus comprises memory means for storing information.

5. The image processing apparatus according to claim 1, wherein said apparatus comprises memory means fixed detachably to the apparatus for storing said information.

6. The image processing apparatus according to claim 1, wherein said apparatus comprises first memory means provided inside the apparatus and second memory means fixed detachably to the apparatus for storing said information.

7. An image processing apparatus for effecting color conversion on input image data and producing an outcome of said color conversion, comprising:

an interface for introducing image data;

an image memory for storing said introduced image data;

an extracting circuit for analyzing the input image data with respect to picture elements thereof and extracting a plurality of characteristic magnitudes which represent color tone of said input image data;

a characteristic magnitude memory for storing said plurality of characteristic magnitudes extracted by said extracting circuit;

an input device to input information relating to an amount of change of a color component in the color conversion;

a coefficient arithmetic device for computing a conversion coefficient based on said plurality of characteristic magnitudes extracted by said extracting circuit and said information inputted by said input device;

a coefficient memory for storing a conversion coefficient calculated by said coefficient arithmetic device; and a conversion circuit for converting said image data by sequentially reading out the image data already introduced and stored with the aid of conversion coefficients calculated by said coefficient arithmetic device.

8. The image processing apparatus according to claim 7, wherein said input device comprises a portable recording medium fixed detachably to the apparatus and a portable memory medium drive, said information being stored in said portable recording medium and being read out by said portable memory medium drive.

9. An image processing apparatus for effecting color conversion of input image data and producing an outcome of said color conversion, which apparatus comprises:

an input part for introducing image data;

a memory part for storing said introduced image data;

extracting means for analyzing the input image with respect to picture elements thereof and extracting a plurality of color data which represent characteristics of color tone of said input image data;

input means for inputting information related to an amount of change of a color component in color conversion;

arithmetic means for computing a conversion coefficient based on the plurality of color data extracted by said extracting means and the information inputted by said input means; and conversion means for sequentially reading out the image data from said memory means and for effecting color conversion by multiplying the read out image data and said computed conversion coefficient.

10. The image processing apparatus according to claim 9, wherein said color data extracted by said extracting means include a value representing the most intensely reddish color of the input image, the most intensely greenish color of the input image, and the most intensely bluish color of the input image.

11. The image processing apparatus according to claim 9, wherein said color data extracted by said extracting means include a location of a center of gravity of the input image.

12. The image processing apparatus according to claim 9, wherein said information inputted by said input means represents a color temperature and a color of light source.

13. The image processing apparatus according to claim 9, wherein said information inputted by said input means represents an intensity of light source and a range of color of expression.

14. The image processing apparatus according to claim 9, wherein said information inputted by said input means represents a difference between chromaticity of a designated memorized color and chromaticity of standard memorized color.

* * * * *